United States Patent
Ku et al.

(10) Patent No.: US 8,713,629 B2
(45) Date of Patent: Apr. 29, 2014

(54) METHOD FOR ACCESSING WIRELESS NETWORK

(75) Inventors: Ha-Kuang Ku, Taichung (TW); Hua-Lin Chang, Hsinchu (TW); Feng-Hsing Wang, Tainan (TW)

(73) Assignee: Altek Corporation, Hsinchu (TW)

( * ) Notice: Subject to any disclaimer, the term of this patent is extended or adjusted under 35 U.S.C. 154(b) by 306 days.

(21) Appl. No.: 13/208,366

(22) Filed: Aug. 12, 2011

(65) Prior Publication Data

US 2012/0297442 A1    Nov. 22, 2012

(30) Foreign Application Priority Data

May 19, 2011    (TW) .............................. 100117612 A

(51) Int. Cl.
*H04L 29/06*    (2006.01)
*H04W 12/06*    (2009.01)
*G06F 21/44*    (2013.01)
*G06F 21/31*    (2013.01)

(52) U.S. Cl.
CPC .............. *H04W 12/06* (2013.01); *G06F 21/44* (2013.01); *H04L 63/083* (2013.01); *G06F 21/31* (2013.01)
USPC ......... 726/1; 726/5; 726/8; 713/168; 715/742

(58) Field of Classification Search
CPC ....... G06F 21/44; G06F 21/31; H04L 63/083; H04W 12/06
USPC ............................................................ 726/1
See application file for complete search history.

(56) References Cited

U.S. PATENT DOCUMENTS

2008/0060064 A1*   3/2008   Wynn et al. ...................... 726/5
2012/0297190 A1*   11/2012   Shen et al. .................... 713/168

FOREIGN PATENT DOCUMENTS

| TW | 550471 | 9/2003 |
| TW | 550477 | 9/2003 |
| TW | 200905497 | 2/2009 |

OTHER PUBLICATIONS

McCann, Stephen, Robert Hancock, and Eleanor Hepworth. "Novel WLAN Hotspot Authentication." Fifth IEEE International Conference on 3G Mobile Communication Technologies, 2004, pp. 59-63.*
"Office Action of Taiwan Counterpart Application", issued on Aug. 28, 2013, p. 1-p. 7.

* cited by examiner

*Primary Examiner* — Taghi Arani
*Assistant Examiner* — Narciso Victoria
(74) *Attorney, Agent, or Firm* — Jianq Chyun IP Office

(57) ABSTRACT

A wireless network accessing method adaptable to a portable electronic device is provided. The wireless network accessing method includes following steps. A wireless access point (WAP) is connected. An authentication webpage is received from the WAP. A layout of the authentication webpage is analyzed by using a database to find out an account field and a password field of the authentication webpage. An account and a password input by a user are received. The account field filled with the account and the password field filled with the password are sent to the WAP.

5 Claims, 6 Drawing Sheets

METHOD FOR ACCESSING WIRELESS NETWORK

CROSS-REFERENCE TO RELATED APPLICATION

This application claims the priority benefit of Taiwan application serial no. 100117612, filed May 19, 2011. The entirety of the above-mentioned patent application is hereby incorporated by reference herein and made a part of this specification.

BACKGROUND OF THE INVENTION

1. Field of the Invention

The invention generally relates to a method for accessing a network, and more particularly, to a method for accessing a wireless network.

2. Description of Related Art

Nowadays, the Internet and communication technologies are developing drastically, and people need to learn new knowledge or communicate with each other through the Internet at anytime and from anywhere. Thus, people want to be able to connect to the Internet conveniently regardless of whether they are indoors or outdoors. As a result, many products or Internet connection techniques combining the Internet and the communication technologies have been developed.

Presently, digital cameras built in with wireless network functions and accordingly group sharing functions have become a trend. For example, wireless access points (WAP) are deployed in many public places to allow users to surf the Internet. Accordingly, a user can connect to a WAP through the wireless network function of a digital camera and share his/her photos on the Internet.

WAPs deployed in public places usually adopt an account/password mechanism to restrict the usage of wireless networks. For example, when a user starts a web browser to browse a webpage, a WAP redirects to an authentication webpage, and the user is required to input his/her account/password in the authentication webpage. After the authentication is passed, the WAP redirects to the original webpage desired by the user. The user can only use the network services shared by the WAP after going through such an authentication process. However, most digital cameras do not come with any built-in web browser therefore cannot provide such an authentication mechanism. Thus, the desired network services cannot be enjoyed even if the digital camera is fully equipped with necessary hardware.

SUMMARY OF THE INVENTION

Accordingly, the invention is directed to a wireless network accessing method which allows a portable electronic device (for example, a digital camera) to pass the authentication of a wireless access point (WAP).

The invention provides a wireless network accessing method adaptable to a portable electronic device. The wireless network accessing method includes following steps. First, a WAP is connected. Then, an authentication webpage is received from the WAP. Next, a layout of the authentication webpage is analyzed by using a database to find out an account field and a password field of the authentication webpage. After that, an account and a password input by a user are received. Next, the account field filled with the account and the password field filled with the password are sent to the WAP.

According to an embodiment of the invention, the step of analyzing the layout of the authentication webpage by using the database includes following steps. First, a plurality of rules in the database is compared according to the layout of the authentication webpage. Then, if the layout of the authentication webpage completely satisfies the rules, the account field and the password field are found out according to the rules. If the layout of the authentication webpage partially satisfies the rules, a fractional ratio of the rules is calculated to estimate the positions of the account field and the password field. If the layout of the authentication webpage and the rules are not comparable, a comparison log is recorded.

According to an embodiment of the invention, after the portable electronic device successfully connects to the Internet, the wireless network accessing method further includes sending the comparison log to an analysis server.

According to an embodiment of the invention, the wireless network accessing method further includes following steps. The comparison log is analyzed through the analysis server to establish a new rule. After the portable electronic device successfully connects to the Internet, the new rule is downloaded into the database.

According to an embodiment of the invention, before the step of comparing the rules in the database, the wireless network accessing method further includes analyzing a plurality of authentication webpage samples through an analysis server to establish the rules.

According to an embodiment of the invention, the wireless network accessing method further includes following steps. First, an authentication code field and a graphic authentication code of the authentication webpage are found out by using the layout of the database analysis authentication webpage. Then, the graphic authentication code is displayed, and an authentication code input by the user is received. Next, the authentication code field filled with the authentication code is sent to the WAP.

In summary, the invention provides a wireless network accessing method, wherein the layout of an authentication webpage is analyzed by using a database to find out an account field and a password field, so that a user can conveniently input his/her account and password to complete the authentication process.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5A is a diagram of an authentication webpage according to another embodiment of the invention.

FIG. 5B is a diagram of a user interface of a portable electronic device according to another embodiment of the invention.

DESCRIPTION OF THE EMBODIMENTS

Figure 1:
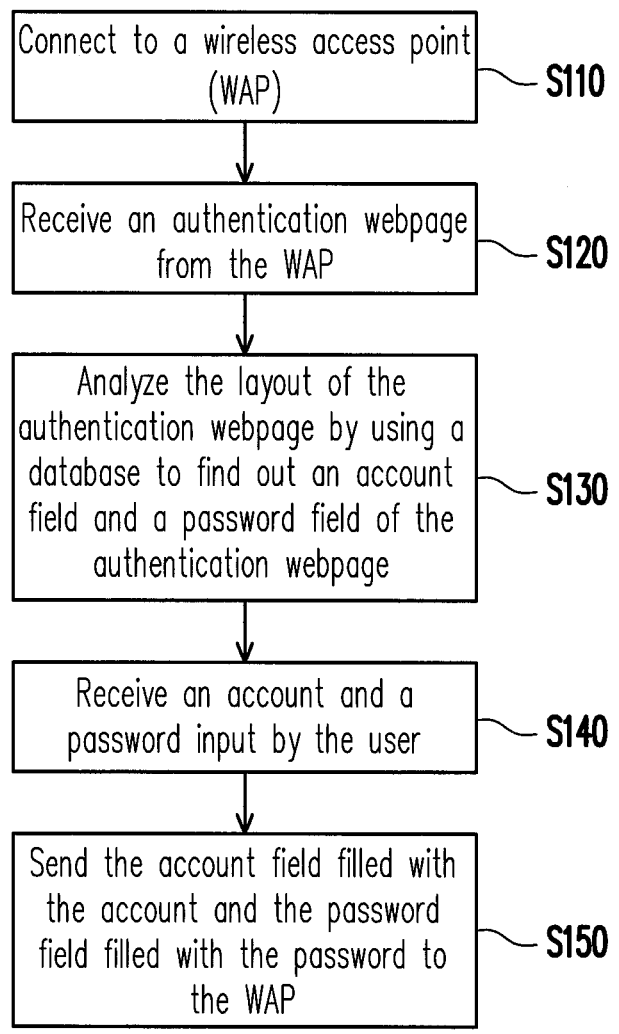
FIG. 1 is a flowchart of a wireless network accessing method according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
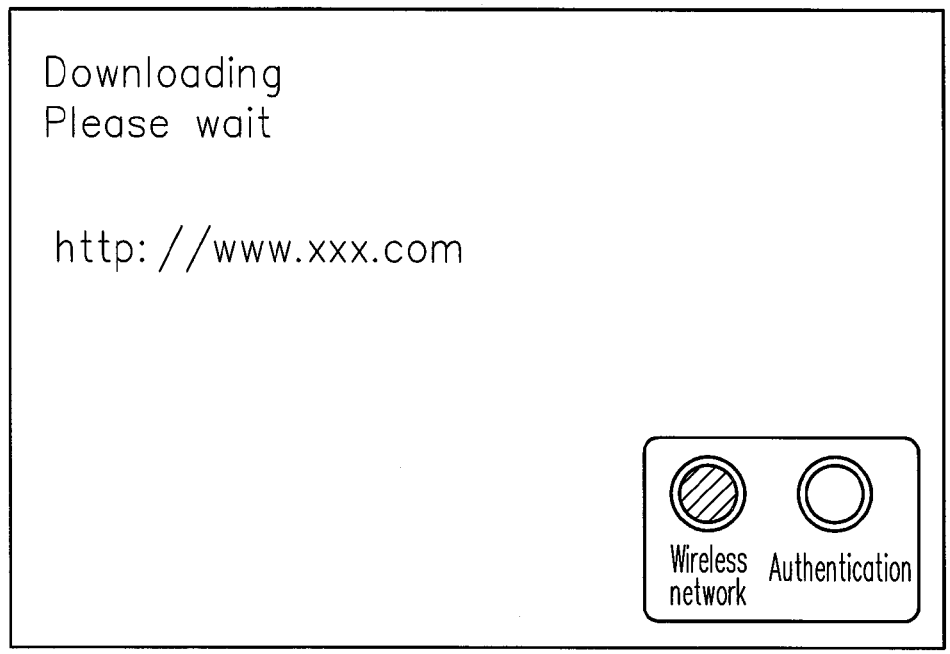
FIGS. 2A-2C are diagrams of a user interface of a portable electronic device.
Figure 2B:
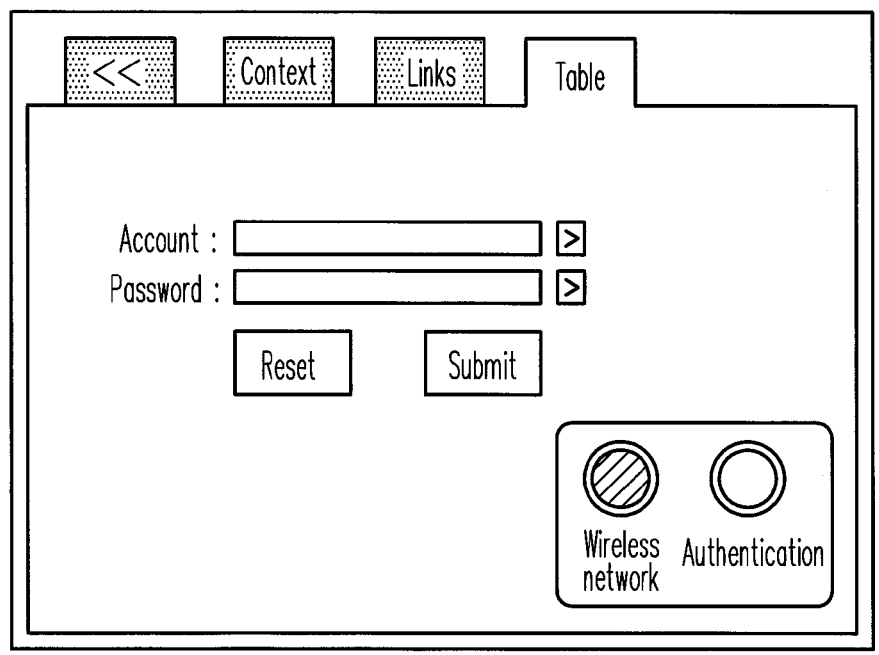
Figure 2C:
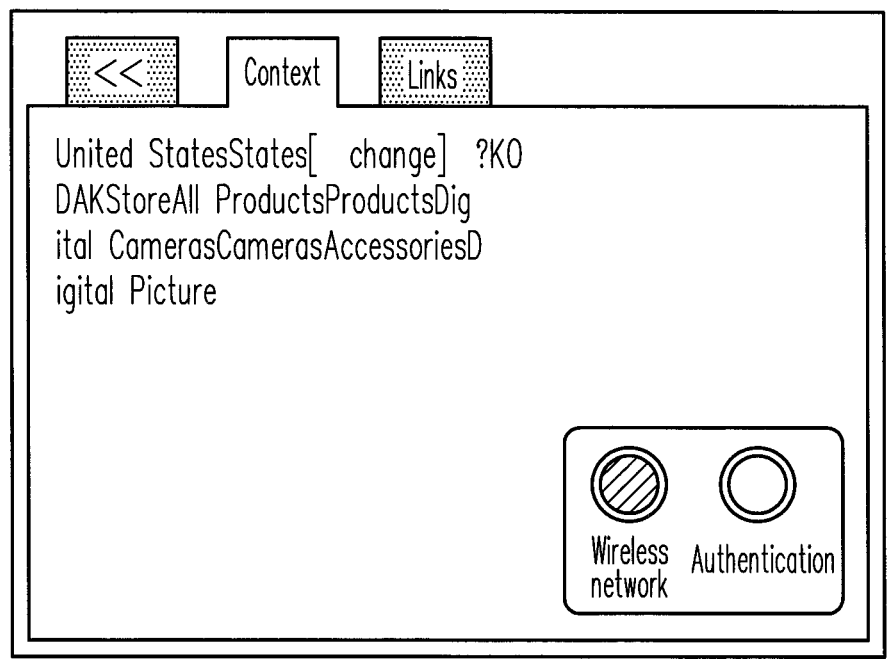

FIG. 1 is a flowchart of a wireless network accessing method according to an embodiment of the invention. Referring to FIG. 1, the wireless network accessing method in the present embodiment is adaptable to a portable electronic device without a browser (not shown), such as a digital camera. FIGS. 2A-2C are diagrams of a user interface of a portable electronic device. Below, the flowchart in FIG. 1 will be described with reference to FIGS. 2A-2C.

First, in step S110, a wireless access point (WAP) is connected to. A user can turn on a wireless network of the portable electronic device and activate a group sharing function. For example, as shown in FIG. 2A, when the user activates the group sharing function, the portable electronic device connects to a predetermined web address "www.xxx.com" to allow the user to upload photos to a webpage corresponding to foregoing web address. The components at the bottom right corner of the user interface represent a "wireless network" state and an "authentication" state. Herein the wireless network is turned on but the authentication is not yet done.

Figure 3:
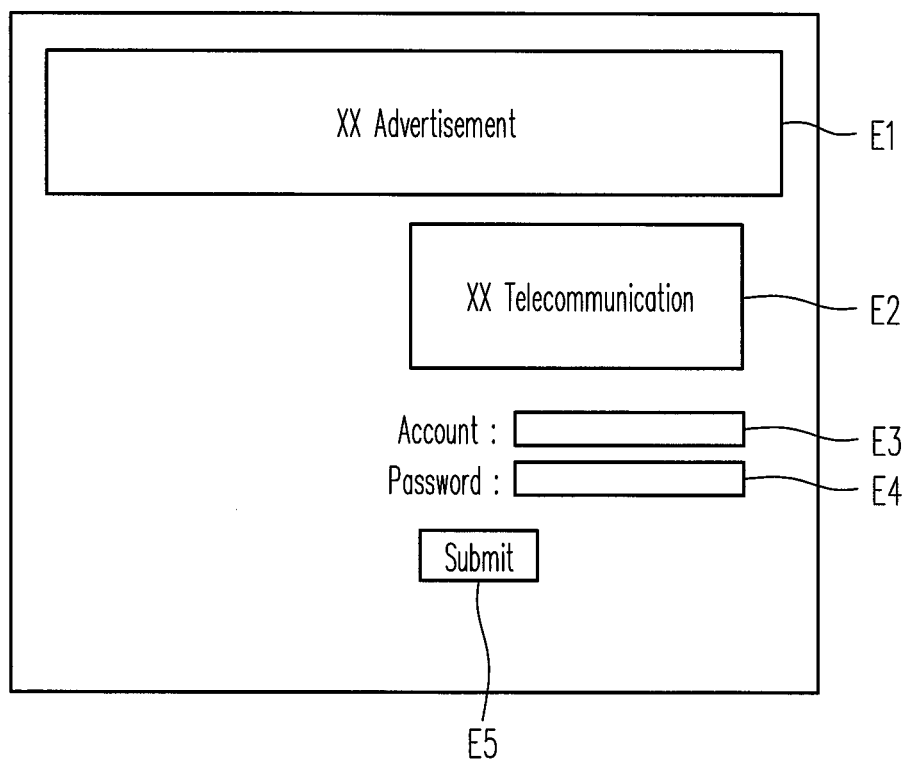
FIG. 3 is a diagram of an authentication webpage according to an embodiment of the invention.

Then, in step S120, an authentication webpage is received from the WAP. When the portable electronic device connects to the web address "www.xxx.com", the WAP redirects to the authentication webpage. FIG. 3 is a diagram of an authentication webpage according to an embodiment of the invention. Referring to FIG. 3, it can be observed in a general browser that the authentication webpage contains components E1-E5, wherein the component E1 is an advertisement link, the component E2 is a logo of the WAP, the component E3 is an account field, the component E4 is a password field, and the component E5 is a "Submit" component.

Next, in step S130, the layout of the authentication webpage is analyzed by using a database, so as to find out the account field and the password field of the authentication webpage. Namely, the layout of the authentication webpage is compared with layouts stored in the database to find out the components E3 and E4 (i.e., the account field and the password field).

After that, in step 140, an account and a password input by the user are received. As shown in FIG. 2B, the user interface shows an account input box and a password input box for receiving the account and the password. The user can input the account and the password through the physical keyboard of the portable electronic device or by operating a virtual keyboard through input devices such as arrow keys, scroll bars, or a touch panel.

Next, in step S150, the account field filled with the account and the password field filled with the password are sent to the WAP. When the user presses down the "Submit" in FIG. 2B, the portable electronic device sends the data in the account input box and the password input box to the WAP as the values of the components E3 and E4. By now, the authentication process of the WAP is completed. Referring to FIG. 2C, the WAP then redirects the authentication webpage back to the webpage corresponding to the web address "www.xxx.com", and the context of the webpage is displayed in the user interface. Herein the components at the bottom right corner indicate that the wireless network is turned on and the authentication is completed.

It should be mentioned that even though the portable electronic device comes with no browser, the authentication can be done in the authentication webpage through the wireless network accessing method provided by the present embodiment. Thereby, the wireless network function of the portable electronic device is made more usable.

Moreover, as shown in FIG. 2C, the user can further click at the "Links" tab to display links in "www.xxx.com" in the user interface as an enumeration, so that the user can perform simple webpage browsing operations through the arrow keys, scroll bars, or touch panel of the portable electronic device.

Figure 4:
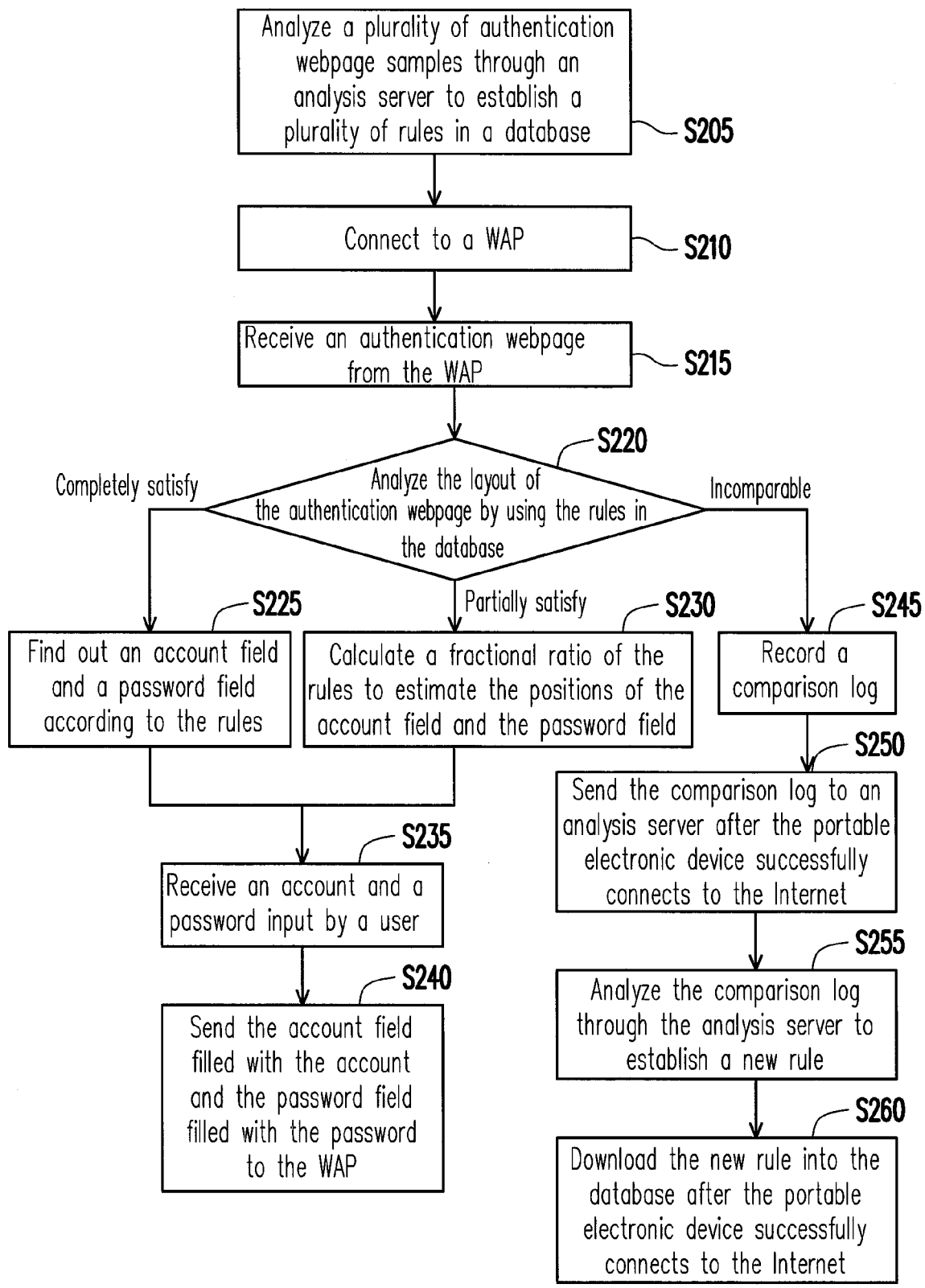
FIG. 4 is a flowchart of a wireless network accessing method according to another embodiment of the invention.

FIG. 4 is a flowchart of a wireless network accessing method according to another embodiment of the invention. Referring to FIG. 4, first, in step S205, a plurality of authentication webpage samples is analyzed through an analysis server to establish a plurality of rules. For example, the account field and the password field are usually located in the middle of an authentication webpage, the account field is followed by the password field, the account field and the password field are two input boxes next to each other, and the account field and the password field are located after the title and logo and before the copyright description. These rules are stored in the database of the portable electronic device according to the analysis result of the authentication webpage samples.

Then, in step S210, the portable electronic device connects to a WAP. Next, in step S215, an authentication webpage is received from the WAP. In step S220, the rules in the database are compared according to the layout of the authentication webpage. Regarding the authentication webpage illustrated in FIG. 3, there are two continuous input boxes E3 and E4 after the logo E2, which completely satisfies the rules in the database. In this case, step S225 is executed, wherein the account field and the password field are found out according to the rules. Because the input box E4 is right next to the input box E3, the input boxes E3 and E4 can be determined to be respectively the account field and the password field.

After that, in step S235, an account and a password input by the user are received through the user interface illustrated in FIG. 2B. Next, in step S240, the account field filled with the account and the password field filled with the password are sent to the WAP to complete the authentication process.

Figures 5A, 5B:
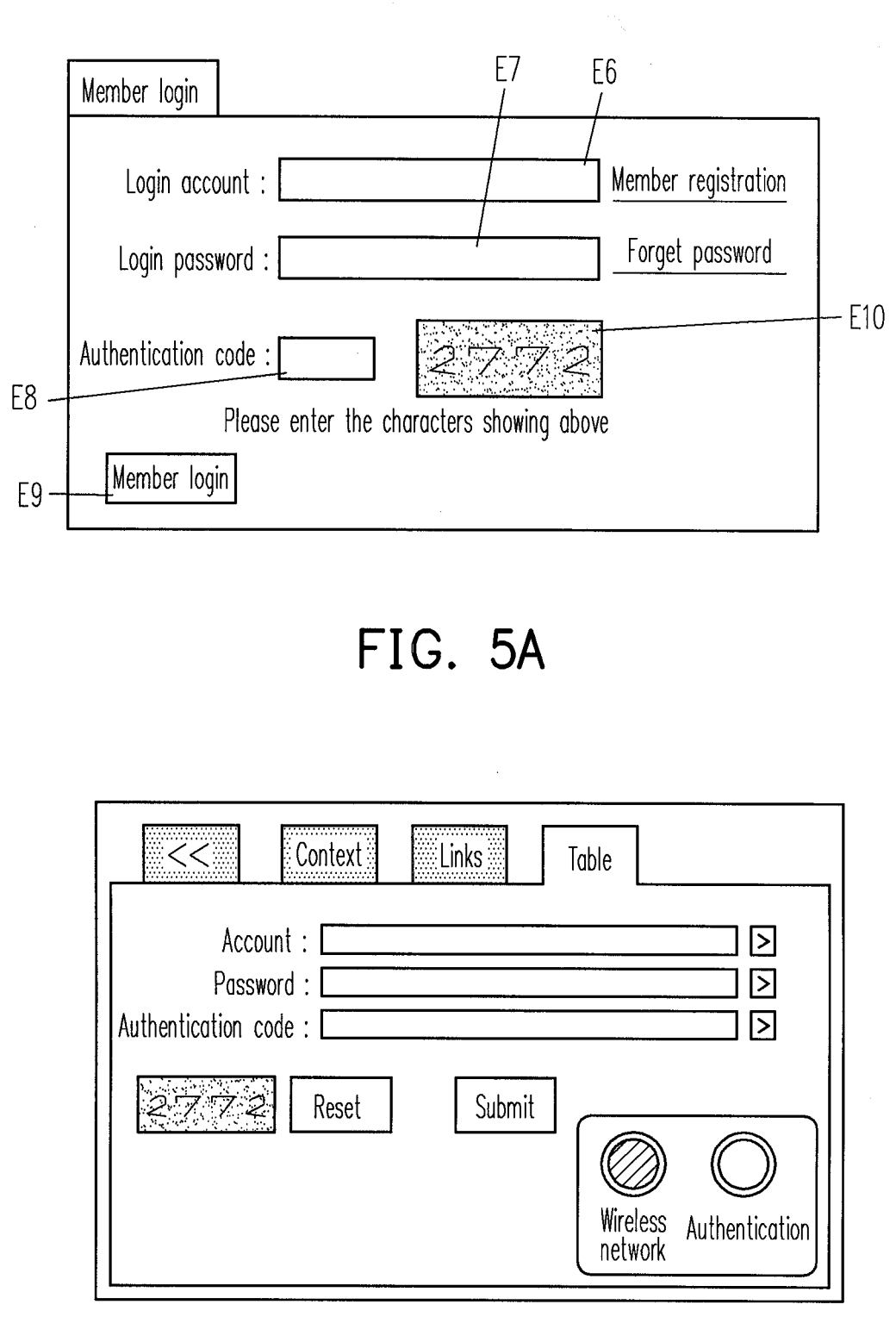

Furthermore, an authentication webpage may also display an authentication code in a graphic format such that an "automatic login program" cannot recognize the authentication code. FIG. 5A is a diagram of an authentication webpage according to another embodiment of the invention, and FIG. 5B is a diagram of a user interface of a portable electronic device according to another embodiment of the invention. Referring to FIG. 5A, the authentication webpage contains components E6-E10, wherein the component E6 is an account field, the component E7 is a password field, the component E8 is an authentication code field, the component E9 is a "Submit" component, and the component E10 is a graphic authentication code. If the authentication code field E8 and the graphic authentication code of the authentication webpage are found out in step S220 through the analysis of the layout of the authentication webpage by using the database, the user interface in FIG. 5B further displays an authentication code input box and the graphic authentication code to receive an authentication code input by the user. While subsequently the account field and the password field are sent to the WAP, the authentication code field filled with the authentication code is also sent to the WAP.

In addition, if it is determined in step S220 that the layout of the authentication webpage partially satisfies the rules, step S230 is executed to calculate a fractional ratio of the rules, so as to estimate the positions of the account field and the password field. In this case, even though the authentication webpage received by the portable electronic device is never analyzed by the analysis server, the positions of the account field and the password field can still be correctly identified with the similar webpage design. Steps S235 and S240 are executed after step S230 to complete the authentication process.

Moreover, if it is determined in step S220 that the layout of the authentication webpage and the rules are incomparable, step S245 is executed to record a comparison log. The comparison log may record the incomparable authentication webpage and the connection time. After that, in step S250, the comparison log is sent to an analysis server after the portable electronic device successfully connects to the Internet. For example, after the user gets home and connects the portable electronic device to a wireless network, the portable electronic device automatically sends the comparison log to the analysis server. Next, in step S255, the comparison log is analyzed through the analysis server to establish a new rule. In step S260, the new rule is downloaded into the database after the portable electronic device successfully connects to the Internet. Namely, the analysis server provides an update function to increase the comparison success rate of the portable electronic device.

In summary, the invention provides a wireless network accessing method, wherein the layout of an authentication webpage is analyzed by using a database to find out an account field and a password field, so that even if a portable electronic device does not have any browser, a user can still input his/her account/password conveniently to complete an authentication process. In addition, if a new authentication webpage cannot be compared with rules in the database, the existing database can be updated through the analysis of comparison log.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A wireless network accessing method, adaptable to a portable electronic device, the wireless network accessing method comprising:
   connecting to a wireless access point (WAP);
   receiving an authentication webpage from the WAP;
   analyzing a layout of the authentication webpage by using a database to find out an account field and a password field of the authentication webpage, comprising:
      comparing a plurality of rules in the database according to the layout of the authentication webpage;
      when the layout of the authentication webpage completely satisfies the rules, finding out the account field and the password field according to the rules;
      when the layout of the authentication webpage partially satisfies the rules, calculating a fractional ratio of the rules to estimate positions of the account field and the password field; and
      when the layout of the authentication webpage and the rules are not comparable, recording a comparison log;
   receiving an account and a password input by a user; and
   sending the account field filled with the account and the password field filled with the password to the WAP.

2. The wireless network accessing method according to claim 1 further comprising:
   after the portable electronic device successfully connects to an Internet, sending the comparison log to an analysis server.

3. The wireless network accessing method according to claim 2 further comprising:
   analyzing the comparison log through the analysis server to establish a new rule; and
   after the portable electronic device successfully connects to the Internet, downloading the new rule into the database.

4. The wireless network accessing method according to claim 1, wherein before the step of comparing the rules in the database, the wireless network accessing method further comprises:
   analyzing a plurality of authentication webpage samples through an analysis server to establish the rules.

5. The wireless network accessing method according to claim 1 further comprising:
   analyzing the layout of the authentication webpage by using the database to find out an authentication code field and a graphic authentication code of the authentication webpage;
   displaying the graphic authentication code, and receiving an authentication code input by the user; and
   sending the authentication code field filled with the authentication code to the WAP.

* * * * *